(12) United States Patent
Banks et al.

(10) Patent No.: US 9,891,093 B2
(45) Date of Patent: Feb. 13, 2018

(54) METHOD FOR DETERMINING LIQUID-VAPOR INTERFACE VIA GAMMA RADIATION

(71) Applicant: JOHNSON MATTHEY PUBLIC LIMITED COMPANY, London (GB)

(72) Inventors: Graham Banks, Cleveland (GB); Lowell Thomas Pless, Houston, TX (US)

(73) Assignee: Johnson Matthey Public Limited Company, London, England (GB)

( * ) Notice: Subject to any disclaimer, the term of this patent is extended or adjusted under 35 U.S.C. 154(b) by 331 days.

(21) Appl. No.: 14/771,953

(22) PCT Filed: Mar. 7, 2014

(86) PCT No.: PCT/GB2014/050687
§ 371 (c)(1),
(2) Date: Sep. 1, 2015

(87) PCT Pub. No.: WO2014/135897
PCT Pub. Date: Sep. 12, 2014

(65) Prior Publication Data
US 2016/0011035 A1    Jan. 14, 2016

Related U.S. Application Data

(60) Provisional application No. 61/774,235, filed on Mar. 7, 2013.

(51) Int. Cl.
*G01F 23/22*    (2006.01)
*G01F 23/288*   (2006.01)
*G01F 23/00*    (2006.01)

(52) U.S. Cl.
CPC ........ *G01F 23/288* (2013.01); *G01F 23/0061* (2013.01); *G01F 23/0069* (2013.01); *G01F 23/2885* (2013.01)

(58) Field of Classification Search
None
See application file for complete search history.

(56) References Cited

U.S. PATENT DOCUMENTS 2,323,128  A  *  6/1943  Hare ..................... G01F 23/288
                                                137/392
3,668,392  A  *  6/1972  Bajek .................... G01F 23/288
                                                378/52

(Continued)

FOREIGN PATENT DOCUMENTS

GB    1 145 332 A    3/1969
JP    S50 25266 A    3/1975

OTHER PUBLICATIONS

International Search Report, dated Jun. 18, 2014, from corresponding PCT application.

*Primary Examiner* — Thomas R Artman
(74) *Attorney, Agent, or Firm* — Baker & Hostetler LLP

(57) ABSTRACT

A method for determining the position of a liquid interface between a lower tray and an upper tray in a process apparatus such as a distillation column, using gamma scanning and comparing the maximum count rate of gamma photons measured between two trays with the count rate attributed to scanning through the apparatus filled with vapor. The method enables the operating parameters of the apparatus to be optimized and provides a manner of calculating the % flood of an individual tray.

17 Claims, 3 Drawing Sheets

(56) References Cited

U.S. PATENT DOCUMENTS

| | | | |
|---|---|---|---|
| 7,010,087 B2 * | 3/2006 | Robins | G01N 23/08 378/50 |
| 7,800,061 B2 | 9/2010 | James et al. | |
| 2003/0112920 A1 * | 6/2003 | Robins | G01N 23/08 378/50 |
| 2005/0250860 A1 * | 11/2005 | Appleford | B01D 17/0208 516/135 |
| 2008/0290302 A1 * | 11/2008 | James | G01N 23/06 250/522.1 |
| 2009/0099808 A1 * | 4/2009 | Winfield | G01N 9/24 702/137 |

\* cited by examiner

METHOD FOR DETERMINING LIQUID-VAPOR INTERFACE VIA GAMMA RADIATION

The invention concerns a method for determining the operating characteristics of a distillation column, or other process apparatus, based on density measurements made by radiological scanning methods.

It is known to use radiological scanning to measure characteristics of industrial plant such as distillation columns. Gamma scanning, in which the attenuation of gamma radiation by the internal components of a column is monitored, is widely used to determine changes in the internal process that can affect the operation of the column. For example, missing or broken trays in the column may be identified by this method. It is also possible to determine the height of the liquid on a tray by estimating the mid-height of the liquid layer from density measurements. An object of the invention is to provide an improved method of determining the height of the liquid or froth on a tray of a distillation column. A further object of the invention is to provide an improved method of determining the height of liquid or froth on a tray of a unit of process apparatus which may be a separation unit.

According to the invention we provide a method for determining the position of a liquid interface between a lower tray and an upper tray in a distillation column, or other process apparatus, comprising the steps of:

a) arranging a source of gamma radiation and a detector for said gamma radiation at opposed ends of a horizontal path P through said distillation column, said path P being located at a vertical location between the height of said lower and upper trays and at height H above said lower tray;

b) counting the amount of radiation emitted by the source which is detected by the detector over a known time period to obtain a measured count rate Cn;

c) carrying out steps a) and b) N times to acquire N data points Dn, each consisting of the count rate Cn counted by the detector measuring radiation transmitted along path Pn at height Hn above said lower tray, each path Pn being of the same length and $H_1$ being at or immediately above the height of the lower tray;

d) defining the count rate CV to be the count rate measured over a count rate time period when the path through the column passes through a vapour phase;

e) identifying $C_{MAX}$ where $C_{MAX}$=the maximum of measured counts Cn between said lower tray and said upper tray;

f) estimating the height $H_L$ of the liquid interface by:
  i. if $C_{MAX} \leq CV$ and $C_{MAX} \geq CV-x$ % of CV then $H_L$=Hn at $C_{MAX}$; or
  ii. if $C_{MAX} < CV-x$ % of CV then extrapolating data points, including Dn at $C_{MAX}$ and at least Dn−1 and Dn−2, to find $H_L$ where extrapolated line meets CV; and g) optionally calculating the liquid interface position from $H_L$ and position of lower tray.

The method may, in principle be used to determine the height of liquid or froth on a tray of any appropriate unit of process apparatus. Such a unit may include a separation unit. The method is described herein with reference to a distillation column. The skilled person will be able to apply the teaching of the method to any other process apparatus since the detailed nature of the process occurring within the apparatus is not critical to the method for measuring the liquid levels within the apparatus. References herein to "column" or "distillation column" should be interpreted to refer to a different type of process apparatus if the method is to be applied to such apparatus.

The method includes a step (f) of estimating the height of the liquid level on a tray by comparing the maximum count rate of gamma photons measured between two trays with the count rate attributed to scanning through the apparatus filled with vapour. If more than one count rate fulfils the condition in step f) i, i.e. if more than one count rate $Cn \leq CV$ and $\geq CV-x$ % of CV, then $H_L$ may be taken to be at the lowest height Hn, at which the condition is fulfilled. That minimum height is the first data point above the tray at which the count rate is within x % of the count rate CV measured along a path through the column filled with the vapour phase.

The source of gamma radiation and the detector are both usually located outside the wall(s) of the process apparatus /column. A single source and a single detector may be used and in this case the source and/or detector are moved to a different location to define different paths Pn through the column. Alternatively more than one source and detector may be used to define different paths through the column. If multiple sources and/or detectors are used they may be stationary or they may be moved to one or more different locations between measurements. Gamma scanning of columns and other process plant is already known commercially and the skilled person already knows several methods of performing multiple gamma counts at different paths through a column at incremental heights. Such methods normally include suspending a source and a detector at opposed locations outside a column, counting radiation received by the detector at a particular location for a particular time and then moving the source and detector to a different position to take subsequent count measurements. One such method is described in U.S. Pat. No. 7,800,061. The source is selected to be of a size and type and activity to emit sufficient gamma photons to pass through the column to be detected at a practical count rate. Suitable sources of gamma radiation include $^{60}$Co, $^{24}$Na and $^{137}$Cs, suitably shielded and collimated to emit radiation along the desired path towards the detector. The source and shielding material is usually housed within a suitable protective housing, which is usually equipped with means to support the detector in each of the required scanning locations adjacent the column.

The detector may comprise any suitable gamma detector. Geiger-Müuller (GM) tubes and scintillation detectors are preferred, with scintillation detectors being most preferred. The detector is usually housed within a suitable protective housing, which is usually equipped with means to support the detector in each of the required scanning locations adjacent the column.

The amount of radiation emitted by the source which is detected by the detector is measured. The amount of radiation is conventionally expressed as "counts" and is preferably expressed as a count rate, i.e. a number of counts recorded over a particular period of time. A higher count rate indicates that a greater number of gamma photons passed through the column to the detector, with less attenuation and consequently that the material through which the radiation has passed is less dense.

Normally each count rate Cn is measured over the same period of time, although optionally the time period may differ between count rate measurements. In some cases, for example where sections of the column vary in size or require other adjustments due to very low or very high measured counts, it may be useful to adjust the counting time period. In such cases it is preferred to normalise the count rates so as to render the count rates comparable with each other. The CV value, i.e. the count rate when the path through the process apparatus/column passes through a vapour phase, is determined by scanning at least a section of the tower which has a constant diameter and identifying the maximum measured count rate as CV. Preferably a range of count rates CV+/−x % is designated as representing a range of count rates which represent a path passing through the column filled with vapour. x is normally in the range from about 1 to 15, for example in the range from 4 to 10, e.g. about 6. The range of count rates CV+/−x % may be referred to as the "clear vapour bar" and may be represented graphically on a plot or diagram showing the count rates recorded along different paths through the column at different positions along the column. The CV may optionally be adjusted by the operator of the method, for example to be closer to a predetermined value. The data points from at least some of the scans may be normalised relative to the CV value.

The number N of data points D collected is greater than 3, normally greater than 5. In theory, N may be very large, but in practice N is typically less than 20. Normally the vertical distance between data points is at least 15 mm, preferably at least 25 mm, and may be between about 50 and 75 mm. If an apparatus such as a column is scanned at regularly spaced intervals then the number of data points N depends on the distance between the trays of the column.

In order to identify the liquid height or level above a tray (the lower tray), all of the N data points collected between the lower tray and the next tray above the lower tray are considered and the maximum count rate $C_{MAX}$ is identified. If $C_{MAX}$ is within the range CV+/−x %, then the height at which $C_{MAX}$ was measured is deemed to be the liquid height $H_L$ above the lower tray. If $C_{MAX}$ is outside the range CV+/−x %, i.e. if $C_{MAX}$<CV−x %, then the height $H_L$ is calculated by extrapolation. In this case the data points Dn when Cn=$C_{MAX}$ and at least the next two lower data points $D_{n-1}$ and $D_{n-2}$ are used to extrapolate the data to CV. The height at which the extrapolated data meets CV is then deemed to be the liquid level $H_L$. The method of extrapolation used is usually a line fitting method. It is however important to express the count rate as $Log_{10}$ (count rate) when using linear extrapolation methods.

The calculated liquid height, $H_L$, may be used to calculate certain operating parameters of the column. For example the "% flood" may be calculated by expressing $H_L$ as a percentage of the distance between the lower tray and the upper tray. The $H_L$ value may be used to plan and carry out adjustments to the operating parameters of the column, for example to reduce the height of liquid on a tray and/or to reduce the % flood.

The data points Cn, Hn, CV and range of count rates CV +/−x % may be displayed on a monitor or screen or shown graphically on a representation of the column or other process apparatus which is measured.

Figure 1:
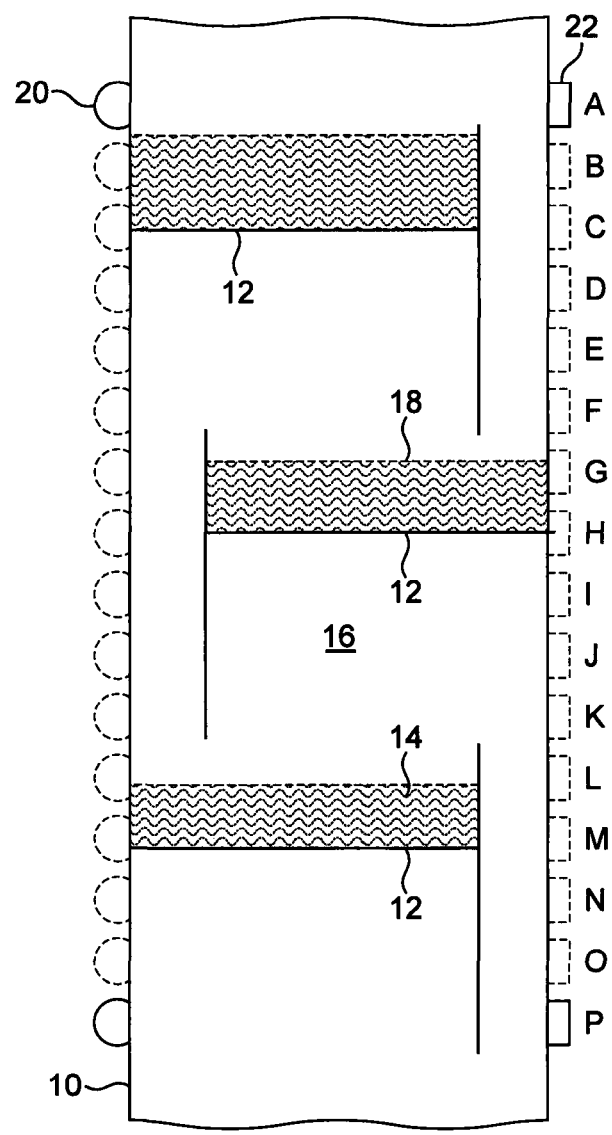
FIG. 1 shows schematic view of a longitudinal section through a part of a distillation column having 3 trays.

In FIG. 1, a part of a distillation column 10 is shown with three trays, 12, each containing a liquid 14 in equilibrium with a vapour 16. The liquid level on each tray is shown by dashed line 18. A source 20 and detector 22 are mounted opposite each other at position A outside the wall of the column such that gamma radiation emitted by the source passes through the column to be detected by detector 22. The source and detector are moved after each measurement to positions shown by the dashed outlines arranged at different heights B-P along the column. The amount of radiation measured by detector 22 depends on the mass and density of the material through which the radiation passes. The count rate detected by the detector at position B, for example, is less than the count rate at position D, because at D the radiation path passes mostly through a vapour phase, whereas at B there is a layer of liquid in the path of the radiation.

Figure 2:
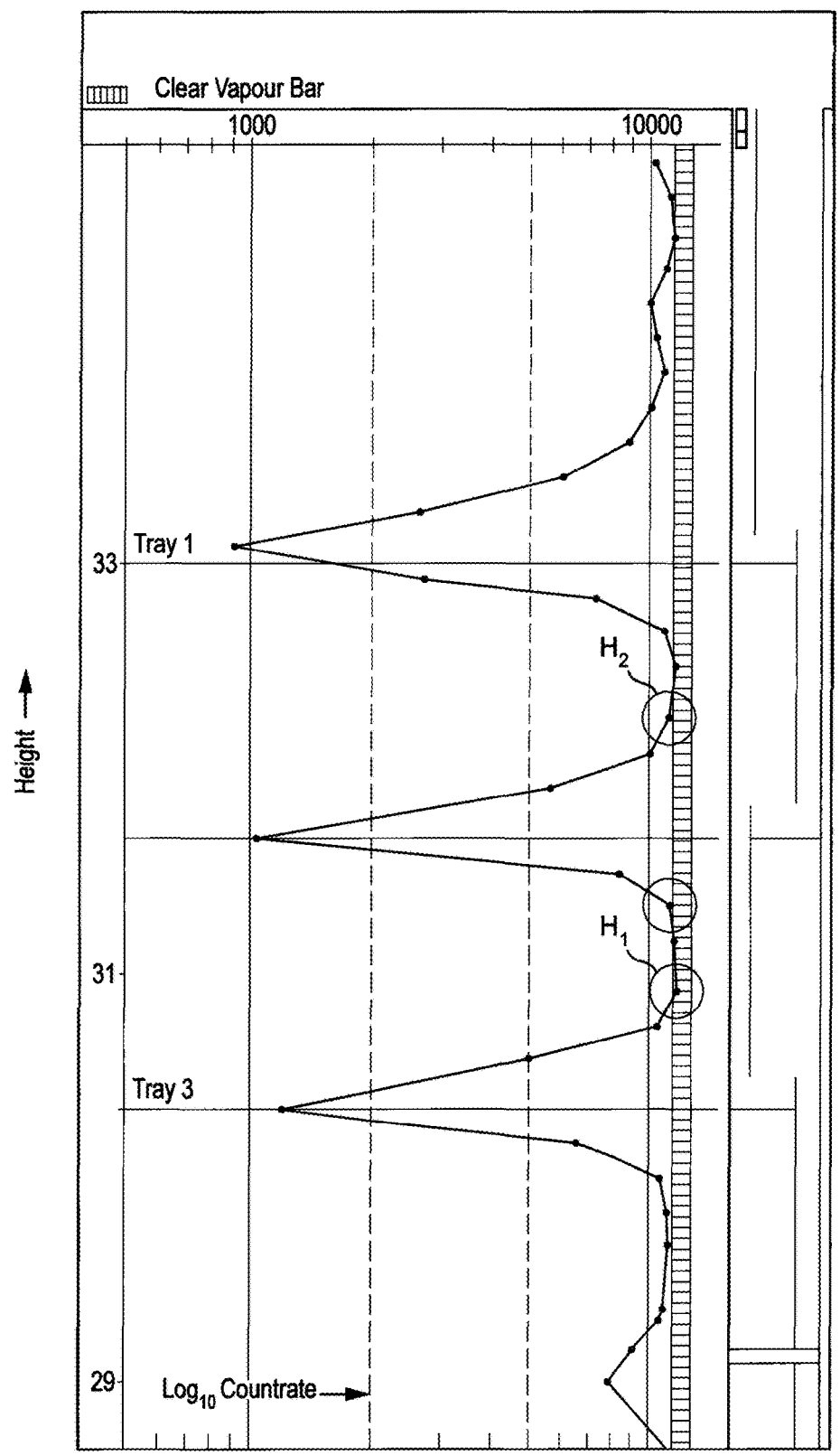
FIG. 2 shows a representation of a gamma scan of a distillation column.
Figure 3:
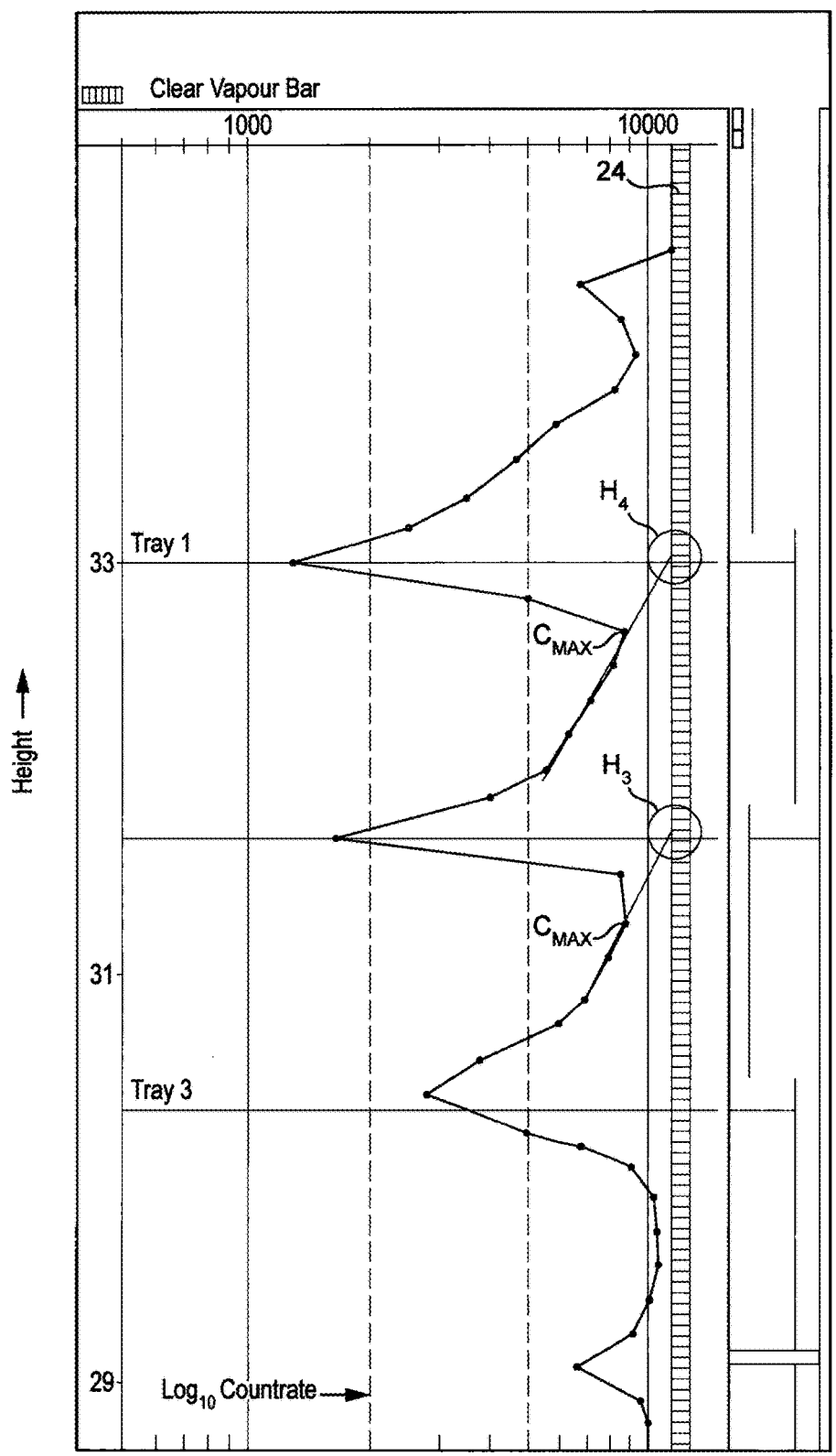
FIG. 3 shows a representation of a different gamma scan of a distillation column.

FIGS. 2 and 3 each show a gamma scan plot resulting from scanning a column similar to that shown in FIG. 1 at several different vertical positions on the column. $Log_{10}$ count rate is plotted horizontally against the height (vertical position of the measurement). The maximum count rate measured over the column is found and a range of count rates within 4% of that maximum is plotted as a hatched bar 24 in FIGS. 2 and 3. This is known as the clear vapour bar. The width of the clear vapour bar depends on the value of x selected. For example, the clear vapour bar may represent a range of count rates within 5% of that maximum or a different % of the maximum. The minimum measured count rates coincide with the position of the metal trays. In FIG. 2, measured count rates at positions successively above tray 3 increase until the count rate coincides with the clear vapour bar, at which point the path of radiation is deemed to pass through vapour. The height at that position is shown ringed as H1 and H2 respectively for trays 3 and 2 on FIG. 2. In FIG. 3 the count rates for the trays shown do not meet the clear vapour bar above trays 3 and 2. In those cases, the maximum count rate $C_{MAX}$ and the preceding 3 data points are extrapolated to the clear vapour bar and the height at that position is deemed to be the height of the liquid level. Those heights are circled by H3 and H4.

The invention claimed is:

1. A method for determining the position of a liquid interface between a lower tray and an upper tray in a process apparatus comprising the steps of:
    a) arranging a source of gamma radiation and a detector for said gamma radiation at opposed ends of a horizontal path P through said process apparatus, said path P being located at a vertical location between the height of said lower and upper trays and at height H above said lower tray;
    b) counting the amount of radiation emitted by the source which is detected by the detector;
    c) carrying out steps a) and b) N times to acquire N data points Dn, each consisting of the count rate Cn counted by the detector measuring radiation transmitted along path Pn at height Hn above said lower tray, each path Pn being of the same length and $H_1$ being at or immediately above the height of the lower tray;
    d) defining the count rate CV to be the count rate when the path through the process apparatus passes through a vapour phase;
    e) identifying $C_{MAX}$ where $C_{MAX}$=the maximum of measured count rates Cn between said lower tray and said upper tray; and
    f) estimating the height $H_L$ of the liquid interface by:—
        i. if $C_{MAX}$≤CV and $C_{MAX}$≥CV−x % of CV then $H_L$=Hn at $C_{MAX}$; or
        ii. if $C_{MAX}$<CV−x % of CV then extrapolate data points, including Dn at $C_{MAX}$ and at least Dn−1 and Dn−2, to find $H_L$ where extrapolated line meets CV.

2. A method according to claim 1 wherein, if more than one count rate fulfils the condition in paragraph f) i, then $H_L$ may be taken to be at the lowest height Hn, at which the condition is fulfilled.

3. A method according to claim 1, further comprising the step of calculating the liquid interface position from $H_L$ and the position of the lower tray.

4. A method according to claim 1, wherein N is at least 5.

5. A method according to claim 1, wherein the count rate is expressed as $\log_{10}$ (count rate) and step ii of part f) is carried out using a straight line fitting method.

6. A method according to claim 1, wherein the calculated liquid height, $H_L$, is used to calculate the % flood by expressing $H_L$ as a percentage of the distance between the lower tray and the upper tray.

7. A method according to claim 1, further comprising the step of adjusting the operating parameters of the process apparatus based on the value of $H_L$ estimated in step f).

8. A method according to claim 1, wherein x is between 1 and 15.

9. A method according to claim 1, wherein said process apparatus is a distillation column.

10. A method according to claim 2, further comprising the step of calculating the liquid interface position from $H_L$ and the position of the lower tray.

11. A method according to claim 2, wherein N is at least 5.

12. A method according to claim 2, wherein the count rate is expressed as $\log_{10}$ (count rate) and step ii of part f) is carried out using a straight line fitting method.

13. A method according to claim 3, wherein the count rate is expressed as $\log_{10}$ (count rate) and step ii of part f) is carried out using a straight line fitting method.

14. A method according to claim 2, wherein the calculated liquid height, $H_L$, is used to calculate the % flood by expressing $H_L$ as a percentage of the distance between the lower tray and the upper tray.

15. A method according to claim 2, further comprising the step of adjusting the operating parameters of the process apparatus based on the value of $H_L$ estimated in step f).

16. A method according to claim 2, wherein x is between 1 and 15.

17. A method according to claim 2, wherein said process apparatus is a distillation column.

* * * * *